(12) United States Patent
Zhao et al.

(10) Patent No.: US 11,385,698 B1
(45) Date of Patent: Jul. 12, 2022

(54) VOLTAGE DROP MANAGEMENT FOR VLSI AND SOC

(71) Applicant: Innogrit Technologies Co., Ltd., Shanghai (CN)

(72) Inventors: Gang Zhao, Chandler, AZ (US); Lin Chen, Cupertino, CA (US); Zhengtian Feng, Shanghai (CN); Qun Zhao, Pleasanton, CA (US)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 1 day.

(21) Appl. No.: 17/137,865

(22) Filed: Dec. 30, 2020

(51) Int. Cl.
*G06F 1/30* (2006.01)
*G06F 3/06* (2006.01)

(52) U.S. Cl.
CPC ............ *G06F 1/305* (2013.01); *G06F 3/0623* (2013.01)

(58) Field of Classification Search
CPC ...................................................... G06F 1/305
See application file for complete search history.

(56) References Cited

U.S. PATENT DOCUMENTS

2019/0146568 A1* 5/2019 Bose .................. G06F 1/305
713/340

FOREIGN PATENT DOCUMENTS

CN 106093638 A * 11/2016
WO WO 8101342 A1 * 5/1981

* cited by examiner

*Primary Examiner* — Mark A Connolly
(74) *Attorney, Agent, or Firm* — IPRO, PLLC; Xiaomin Huang

(57) ABSTRACT

Apparatus and methods are provided for managing voltage drops on a semiconductor chip. One exemplary embodiment according to the present disclosure may provide a method for managing voltage drops in a semiconductor chip. The method may comprise monitoring power supply voltages for different voltage domains in the semiconductor chip by a voltage drop detection circuit, determining that a voltage drop event has occurred based on voltage information and duration information associated with the voltage drop event reported from the voltage drop detection circuit, generating diagnostic information that includes whether the voltage drop event is an external event or an internal event determined based on the voltage information and timing information reported from the voltage drop detection circuit, and taking an action based on the diagnosis information.

21 Claims, 2 Drawing Sheets

VOLTAGE DROP MANAGEMENT FOR VLSI AND SOC

TECHNICAL FIELD

The disclosure herein relates to voltage drop management for semiconductor chips, particularly relates to voltage drop management for Very Large Scale Integration (VLSI) Integrated Circuits (ICs) and System On A Chips (SoCs).

BACKGROUND

Modern System On a Chip (SoC) products heavily rely on clean and reliable power supplies to keep the circuits running at high performance and integrity. The noises on the power supply, particularly voltage drops, tend to cause various issues ranging from a single transaction error to the complete system failure. There are a variety of factors that contribute to voltage drops, as well as a number of mitigation techniques to address the issue at circuit and system levels.

Voltage drops and power supply noises can be induced by external or internal events. External events include system power loss, hot plug or unplug, battery deterioration and failure of voltage regulators. Internal events are related to specific applications with a high load current, such as when the processors and peripherals are exercised with a high frequency and intensity. In general, voltage drops caused by external events will trigger a power-loss process to preserve critical data, and voltage drops due to internal events can be handled by a combination of circuit level, and software or firmware level solutions.

For voltage drops caused by internal events, at hardware level, a high-speed feedback line may be adopted by the SoC to notify the voltage regulator of a voltage drop it has sensed at an early stage, so the voltage regulator can raise the output voltage accordingly. This approach requires fast voltage regulator response, which can often be too late to prevent a circuit failure of the SoC. Also, at the circuit level, the SoC may adopt a throttling technique to intentionally reduce its operating frequency, throughput, number of cores and number of peripherals it is exercising, at the time it senses a voltage drop caused by internal events. Moreover, if the voltage drop is in nature of transient and high-frequency, the issue can also be mitigated through physical implementation by adding various amounts of decoupling capacitors at the circuit and system levels.

SUMMARY

The existing power loss protection technique together with the voltage drop detection circuit, once enabled at firmware level, often takes a brute-force approach to start the power loss protection procedure if a voltage drop is detected. Although this approach may help ensure maximum reliability, it can induce numerous false alarms when a transient voltage drop is treated as a real power loss. As a result, all the regular system usage has to be suspended in place for the power loss procedure, leading to reduced productivity and unhappy users. More advanced system can use both voltage drop amplitude and duration to better evaluate the nature of the voltage drop, but it still fails to distinguish whether the voltage drop is caused by an internal event or an external event. Thus, a temporary voltage drop can still be falsely categorized as a power loss even it is caused by an internal event as long as the drop duration is long enough.

In addition, modern semiconductors usually have different voltage domains for various digital and analog circuitry but the existing techniques do not consider the relationship of voltage droppings among different power domains. As a result, the logical relationship of voltage dropping events among these power domains and their critical timing information fail to be taken into account in voltage drop management.

The present disclosure provides a system and method that employs a voltage drop management for a semiconductor chip. The voltage drop management may include a diagnostic module to accurately diagnose a power loss event from false alarms. The diagnostic module may take inputs of voltage drop and timing information from the voltage drop detection circuits of all power domains, and make a diagnosis on whether it is an external event or internal event. An internal event may be further categorized into a number of sub-categories. Then, the diagnostic module may notify the processor on the semiconductor chip and the processor may execute instructions of firmware to take corresponding actions. The diagnostic module may be implemented in hardware using electronic circuit or software as part of the firmware.

One exemplary embodiment according to the present disclosure may provide a method for managing voltage drops in a semiconductor chip. The method may comprise monitoring power supply voltages for different voltage domains in the semiconductor chip by a voltage drop detection circuit, determining that a voltage drop event has occurred based on voltage information and duration information associated with the voltage drop event reported from the voltage drop detection circuit, generating diagnostic information that includes whether the voltage drop event is an external event or an internal event determined based on the voltage information and timing information reported from the voltage drop detection circuit, and taking an action based on the diagnosis information.

In another exemplary embodiment, there is provided a semiconductor chip that may comprise: a plurality of voltage comparators each configured to compare a power supply voltage to a respective reference voltage, a sampler and counter circuit configured to collect voltage information and timing information from the plurality of voltage comparators, a decision matrix configured to determine whether a voltage drop event has occurred based on voltage information and duration information associated with a voltage drop event reported from the sampler and counter circuit and generate diagnostic information that includes whether the voltage drop event is an external event or an internal event determined based on the voltage information and the timing information reported from the sampler and counter circuit, and a processor configured to take an action based on the diagnosis information from the decision matrix.

In yet another exemplary embodiment, there is provided a semiconductor chip that may comprise: a plurality of voltage comparators each configured to compare a power supply voltage to a respective reference voltage, a sampler and counter circuit configured to collect voltage information and timing information from the plurality of voltage comparators, and a processor. The processor may be configured to: determine whether a voltage drop event has occurred based on the voltage information and duration information associated with a voltage drop event reported from the sampler and counter circuit, generate diagnostic information that includes whether the voltage drop event is an external event or an internal event determined based on the voltage information and the timing information reported from the sampler and counter circuit, and take an action based on the diagnosis information.

DETAILED DESCRIPTION

Figure 1:
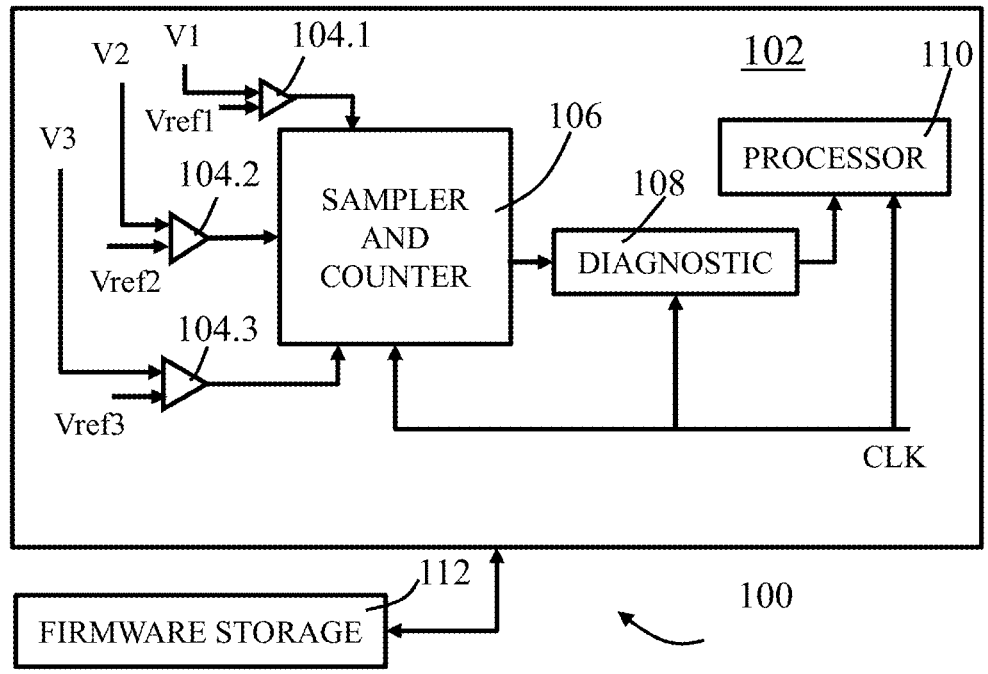
FIG. 1 schematically shows an electronic system with voltage drop management for a semiconductor chip in accordance with an embodiment of the present disclosure.

Specific embodiments according to the present disclosure will now be described in detail with reference to the accompanying figures. Like elements in the various figures are denoted by like reference numerals for consistency.

FIG. 1 schematically shows an electronic system 100 in accordance with an embodiment of the present disclosure. The electronic system 100 may comprise a semiconductor chip 102 and a firmware storage 112. The semiconductor chip 102 may be a Very Large Scale Integration (VLSI) Integrated Circuit (IC) and may comprise a plurality of voltage comparators 104.1, 104.2 and 104.3, a sampler and counter circuit block 106, a diagnostic circuit block 108 and a processor 110. In one embodiment, the electronic system 100 may be a storage system in a computing system. For example, the electronic system 100 may be a solid state drive (SSD) and the semiconductor chip 102 may be a SSD controller.

Electronic systems according to the present disclosure may have a plurality of power domains. As used herein, a power domain may refer to a portion of a system or a portion of a semiconductor chip that may operate with a certain power supply voltage. As an example, the semiconductor chip 102 may have three power domains, V1 domain, V2 domain and V3 domain. V1 may be a primary input power supply voltage to the semiconductor chip 102. For example, V1 may be 3.3V that is generated at the platform level and taken as the input power for the electronic system 100. In one embodiment, V1 may be a power supply provided to a printed circuit board (PCB) to which the semiconductor chip 102 may be attached and provided from the PCB to the semiconductor chip 102.

V2 and V3 may be secondary power supply voltages for specific circuitry domains on the semiconductor chip 102. For example, V2 may be the power supply voltage for core digital logic circuits of the semiconductor chip 102 and V3 may be the power supply voltage for the analog circuits of the semiconductor chip 102. In one embodiment, V2 may be 1.2V and V3 may be 1.8V, and V2 and V3 may be generated by voltage regulators on the PCB to which the semiconductor chip 102 may be attached. In another embodiment, V2 and V3 may be generated by voltage regulators on the semiconductor chip 102.

The voltage comparators 104.1, 104.2 and 104.3 may be used to monitor the power supply voltages in the plurality of power domains on the semiconductor chip 102. The power rails of the three power domains, V1, V2 and V3 may be respectively fed into the inputs of comparators 104.1, 104.2 and 104.3 and compared against respective reference voltages Vref1, Vref2 and Vref3. When any power voltage (e.g., V1, V2 or V3) drops below its corresponding reference voltage, the corresponding comparator (e.g., the comparator 104.1, 104.2 or 104.3) may generate a voltage drop signal and send the voltage drop signal to the sampler and counter circuit block 106. Some voltage drops on the semiconductor chip 102 may cause only one comparator to generate a voltage drop signal. For example, a voltage drop caused by an internal event (e.g., in the digital circuitry or the analog circuitry) may cause only one comparator (e.g., voltage comparators 104.2 or 104.3) to trigger. Some other voltage drops on the semiconductor chip 102 may cause more than one comparator to trigger. For example, a voltage drop caused by an external power loss may cause all comparators to trigger (e.g., V1 may drop below Vref1 first and followed by V2 and V3 dropping below Vref2 and Vref3). In some embodiments, a voltage drop may also be referred to as a voltage drop event and a voltage drop event may include any (e.g., one, two or all) power supply voltages dropping below their respective reference voltages.

The output signals from the comparators 104.1, 104.2 and 104.3 may be sampled and counted by the sampler and counter circuit block 106. The sampler and counter circuit block 106 may be configured to collect the voltage information and timing information associated with the voltage drop signals. The voltage information may include which power supply voltage drops below its respective reference voltage and voltage amplitude information. In some embodiments, the voltage amplitude information may be represented as logic zero ("0") or logic one ("1") output from the comparators 104.1, 104.2 and 104.3 (e.g., the comparator outputs a '1' if a power voltage is greater than its corresponding VREF, and a '0' if the power voltage is less than its corresponding VREF). In some other embodiments, Analog-to-Digital Converters (ADCs) may be used in place of or in addition to the comparators 104.1, 104.2 and 104.3, and the ADCs may generate voltage amplitude information (e.g., a range of '0000' to '1111') to be used by the diagnostic circuit block 108 and/or the processor 110. The timing information may include a time stamp and a duration for how long a power supply voltage may be lowered than the respective reference voltage. The voltage information and timing information may be sent to the diagnostic circuit block 108 for further analysis. In one embodiment, the voltage comparators 104.1 through 104.3 and the sampler and counter circuit block 106 may be collectively referred to as the voltage drop detection circuit.

The diagnostic circuit block 108 may receive the voltage information and timing information associated with voltage drop signals from all triggered comparators and analyze the logic and timing relationship among the signals. The diagnostic circuit block 108 may evaluate the voltage information and duration information reported from the voltage drop detection circuit. When there are voltage droppings reported in any of the power supply voltages, if the reported data is within a threshold, the reported voltage dropping(s) may be considered the voltage dropping(s) insignificant and the diagnostic circuit block 108 will not take further actions. For example, a time duration threshold of 1 microsecond (µs) may be used in an embodiment. When the drop duration is less than this threshold, it may be considered insignificant and no voltage drop event has occurred.

If the reported data exceed the threshold, the diagnostic circuit block 108 may determine that there is a voltage drop event and determine which category (e.g., an external event or internal event) the voltage drop may fall into based on the voltage information and the timing information. For example, if a voltage drop is first detected in the primary power supply voltage (e.g., V1), and is later reported in the secondary power supply voltage(s) (e.g., V2 and V3), then the voltage drop may be determined as an external event and thereby may justify initiation of a power loss protection procedure. If a voltage drop is first detected in a secondary power supply voltage (e.g., V2 or V3) and is later detected in the primary power supply voltage (e.g., V1), then the voltage drop may be determined as an internal event. If a voltage drop is only detected in the secondary power supply voltages (e.g., V2 and V3), then it may also be determined as an internal event.

For an internal event, there may be several sub-categories if a voltage drop is only detected in a secondary power supply voltage. For example, if a voltage drop is only detected with the V2 domain but not with the V3 domain, or vice versa, the diagnostic circuit block 108 may make a further diagnosis about the nature of the internal events. For example, in one embodiment, the diagnostic circuit block 108 may determine that the voltage drop only in the V2 domain may be related to some digital circuitry (e.g., core intensive applications) and that the voltage drop only in the V3 domain may be related to some analog circuitry (e.g., Input/Output I/O intensive applications).

The diagnostic circuit block 108 may generate interrupts based on diagnosis of the voltage drop events and send the interrupts to the processor 110. In one embodiment, the diagnostic circuit block 108 may be implemented as a decision matrix in hardware and the interrupts may be referred to as decision interrupts.

Once the processor 110 is interrupted by the diagnostic circuit block 108, the processor may be configured to take actions based on the diagnosis information. For example, if the voltage drop is due to an internal event from core intensive applications, the processor 110 may be configured to scale back an operating frequency of the primary clock (e.g., slowdown the CLK).

Moreover, the processor 110 may be configured to execute firmware loaded from the firmware storage 112. The firmware may include instructions to further process and respond to the voltage drop events and the diagnosis information based on the interrupts from the diagnostic circuit block 108 to the processor 110. In one embodiment, the firmware may include instructions to handle external events and internal events. For example, for an external event, the instructions may cause the processor 110 to start the power loss protection procedure to save critical data from memory to non-volatile storage. For an internal event, the instructions may cause the processor 110 to choose one or more actions from a set of actions, including but not limited to, raising the output voltage levels of the voltage regulators, throttling the system by limiting the maximum memory channels or storage channels, and reducing the operating frequencies.

In one embodiment, power voltages V2, V3 or both may be provided by a Power Management Integrated Circuit (PMIC) on the PCB to which the semiconductor chip 102 may be attached. The semiconductor chip 102 may control the PMIC via an interface (e.g., an Inter-Integrated Circuit (I2C) interface) that may run at a high frequency (e.g., 100 KHz to 2 MHz) to ensure a real-time configuration of the PMIC. The duration of the voltage drop may be used as the criteria to determine whether a voltage drop event has occurred. When any voltage provided by the PMIC has an voltage drop duration exceeding the threshold, for example, 1 μs, the internal event is likely caused by a large load current, the semiconductor chip 102 may configure the PMIC through the I2C interface to raise the corresponding voltage.

The firmware storage 112 may be a non-volatile storage, such as, but not limited to, read only memory (ROM), programmable read-only memory (PROM), erasable programmable read-only memory (EPROM), or FLASH memory. In one embodiment, the semiconductor chip 102 may be a System on A Chip (SoC) and the firmware storage 112 may be a non-volatile storage coupled to the SoC with firmware stored thereon. During operation, the firmware may be loaded into the SoC and executed by the processor 110.

Figure 2:
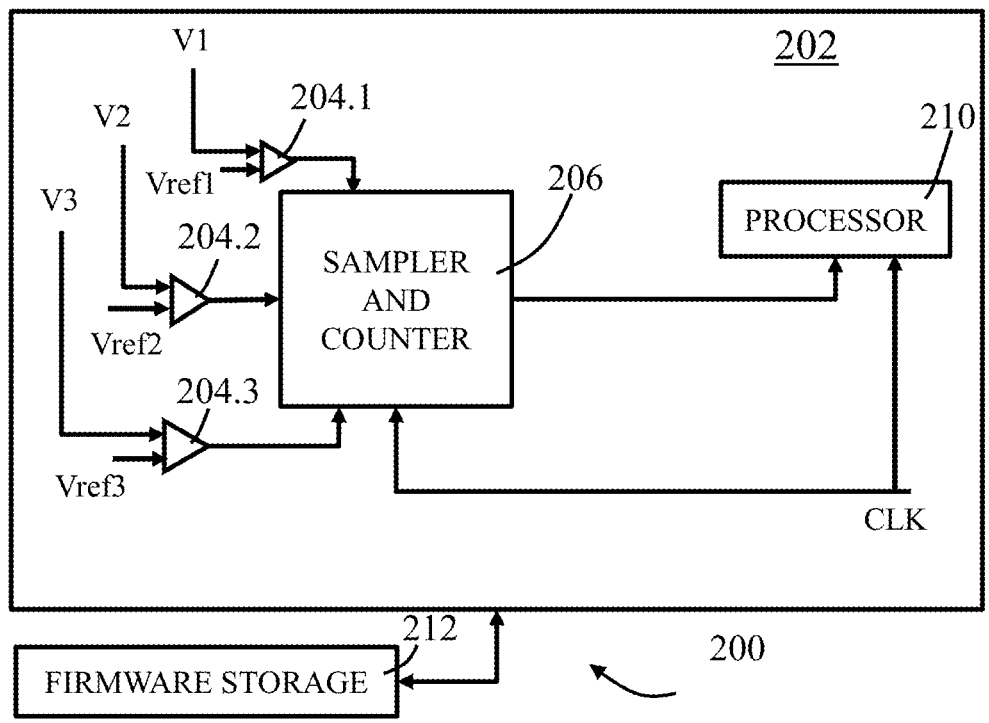
FIG. 2 schematically shows an electronic system with voltage drop management for a semiconductor chip in accordance with another embodiment of the present disclosure.

FIG. 2 schematically shows an electronic system 200 in accordance with another embodiment of the present disclosure. The electronic system 200 may comprise a semiconductor chip 202 and a firmware storage 212. The semiconductor chip 202 may be an alternative embodiment of the semiconductor chip 102, and may comprise a plurality of voltage comparators 204.1, 204.2 and 204.3, a sampler and counter circuit block 206 and a processor 210. The voltage comparators 204.1, 204.2 and 204.3 may be the same as their counterpart voltage comparators 104.1, 104.2 and 104.3 of the semiconductor chip 102. The sampler and counter circuit block 206 may be the same as its counterpart sampler and counter circuit block 106 of the semiconductor 102.

In the electronic system 200, the functionality of the diagnostic circuit block 108 of the semiconductor chip 102 may be implemented by firmware and stored in the firmware storage 212. The firmware may include instructions that may be loaded to the processor 210 and executed by the processor 210. Therefore, the firmware in the electronic system 200 may implement the functionality the diagnostic circuit block 108 (e.g., determining whether the voltage drop is external or internal, and whether an internal event is by any particular circuitry) in addition to the functionality of the firmware in the electronic system 100 (e.g., various actions to handle external events and internal events).

The firmware storage 212 may be a non-volatile storage, such as, but not limited to, read only memory (ROM), programmable read-only memory (PROM), erasable programmable read-only memory (EPROM), or FLASH memory. In one embodiment, the semiconductor chip 202 may be a System on A Chip (SoC) and the firmware storage 212 may be a non-volatile storage coupled to the SoC with firmware stored thereon. During operation, the firmware may be loaded into the SoC and executed by the processor 210.

In one embodiment, the electronic system 200 may also be a storage system in a computing system. For example, the electronic system 200 may be a solid state hard-drive (SSD) and the semiconductor chip 202 may be a SSD controller.

In the electronic system 200, the voltage information and the timing information from the voltage drop detection circuit (e.g., the comparators 204.1 through 204.3 and the sampler and counter circuit block 206) may be passed along to the processor 210 executing the firmware for further analysis. The diagnostic process implemented by the firmware and executed by the processor 210 may take the inputs and decide on the categories and sub-categories of the voltage drop events. The processor 210 may take appropriate actions according to the instructions of the firmware as to whether to start the power loss protection procedure, or to employ other solutions to address the problem based on the nature of the voltage drops. In one embodiment, the voltage drop detection circuit may interrupt the processor 210 of the voltage drop events, yet the semiconductor chip 202 may be configured not to take any actions until instructed by the processor 210 executing the instructions of the firmware.

In various embodiments, the processor 102 and processor 202 may be a computer processor (e.g., a microprocessor or a microcontroller) and the firmware may comprise executable instructions. Embodiments using firmware to implement the diagnostic process may be flexible because different hardware system may need different diagnostic process and it may be easier to reconfigure the diagnostic process by the firmware programs. In contrast, a circuit based decision matrix may only provide a limited number of configurations.

Figure 3:
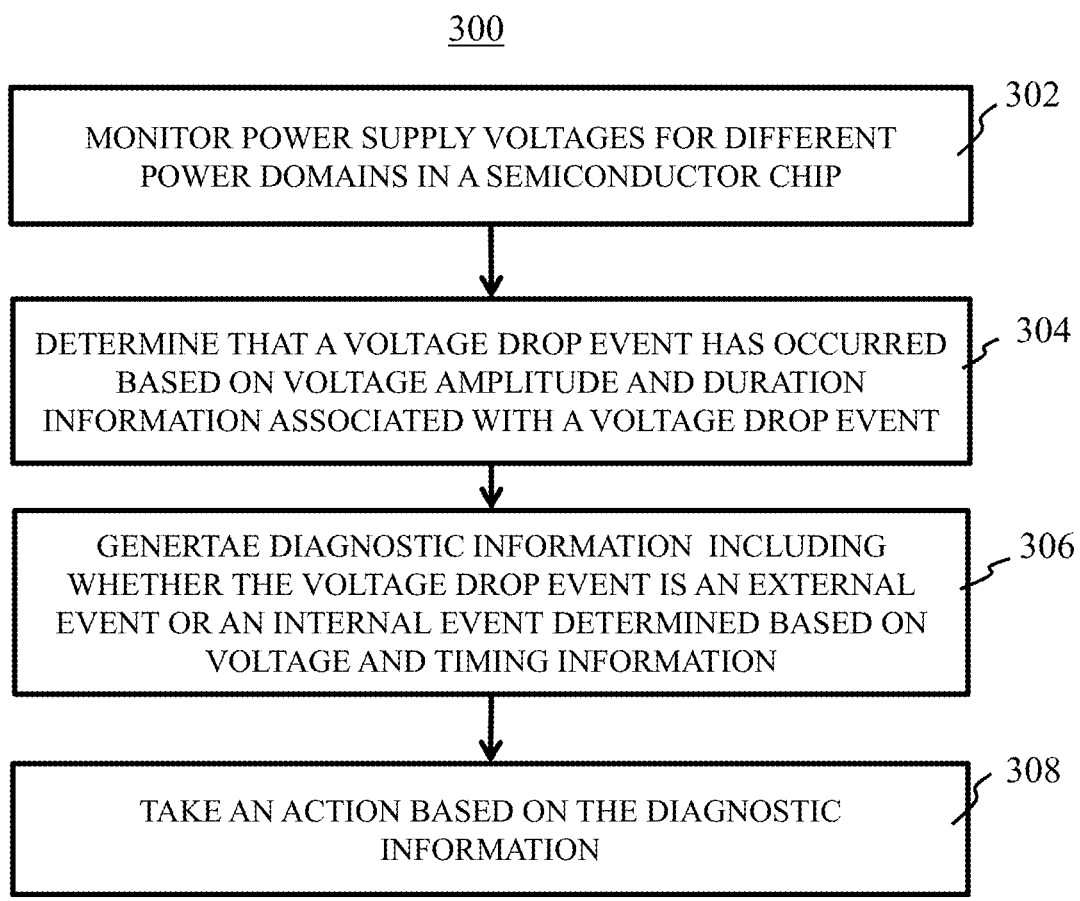
FIG. 3 is a flowchart of a voltage drop management process of a semiconductor chip in accordance with an embodiment of the present disclosure.

FIG. 3 is a flowchart of a voltage drop management process 300 of a semiconductor chip in accordance with an embodiment of the present disclosure. The process 300 may be implemented by the embodiments of the semiconductor chip 102 or the semiconductor chip 202. At block 302, power supply voltages for different voltage domains in a semiconductor chip may be monitored by a voltage drop detection circuit. For example, the plurality of voltage comparators 104.1 through 104.3 and the sampler and counter circuit block 106 may form a voltage drop detection circuit on the semiconductor chip 102, or the voltage comparators 204.1 through 204.3 and the sampler and counter circuit block 206 may form a voltage drop detection circuit on the semiconductor chip 202. The voltage drop detection circuit may monitor the power supply voltages (e.g., V1, V2 and V3) and detect any voltage dropping in any of the power domains.

At block 304, based on voltage information and duration information associated with the voltage drop event reported from the voltage drop detection circuit, it may be determined that a voltage drop event has occurred. For example, the diagnostic circuit block 108 in the semiconductor 102 or the firmware executed by the processor 210 of the semiconductor 202 may implement the logic to make the determination of whether a voltage drop event has occurred. At block 306, diagnostic information may be generated and the diagnostic information may include whether the voltage drop event is an external event or an internal event determined based on the voltage information and the timing information reported from the voltage drop detection circuit. For example, the diagnostic circuit block 108 in the semiconductor 102 implement the logic to determine whether the voltage drop event is external or internal and generate a decision interrupt to the processor 110. In the embodiments of the semiconductor 202, the firmware executed by the processor 210 may implement the logic to determine whether the voltage drop event is external or internal. At block 308, an action may be taken based on the diagnosis information. In various embodiments, the action may be directed or initiated by the processor 110 or 210 by executing instructions of the firmware.

The present disclosure provides a system and method that employs a voltage drop management process for a semiconductor chip that may include a diagnostic module to accurately diagnose a power loss event from false alarms. The diagnostic module may take inputs of voltage drop and timing information from the voltage drop detection circuits of all power domains, and make a diagnosis on whether it is an external event or internal event. An internal event may be further categorized into a number of sub-categories. Then, the diagnostic module may notify the processor on the semiconductor chip and the processor may execute instructions of firmware to take corresponding actions. The diagnostic module may be implemented in hardware using electronic circuit or software as part of the firmware.

One exemplary embodiment according to the present disclosure may provide a method for managing voltage drops in a semiconductor chip. The method may comprise monitoring power supply voltages for different voltage domains in the semiconductor chip by a voltage drop detection circuit, determining that a voltage drop event has occurred based on voltage information and duration information associated with the voltage drop event reported from the voltage drop detection circuit, generating diagnostic information that includes whether the voltage drop event is an external event or an internal event determined based on the voltage information and the timing information reported from the voltage drop detection circuit, and taking an action based on the diagnosis information.

In one embodiment, the voltage information and the timing information reported from the voltage drop detection circuit may indicate that a primary power supply voltage reports a voltage dropping before any secondary power supply voltage reports a voltage dropping, and the voltage drop event may be determined to be an external event.

In one embodiment, the action may be a power loss protection procedure to save critical data from memory to non-volatile storage.

In one embodiment, the voltage information and the timing information reported from the voltage drop detection circuit may indicate that a secondary power supply voltage reports a voltage dropping before a primary power supply voltage reports a voltage dropping, and the voltage drop event may be determined to be an internal event.

In one embodiment, the voltage information and the timing information reported from the voltage drop detection circuit may indicate that only one secondary power supply voltage reports a voltage dropping, and the voltage drop event may be determined to be an internal event.

In one embodiment, the secondary power supply voltage may provide power to core intensive applications and the action may be to scale back an operating frequency of a primary clock of the semiconductor chip.

In one embodiment, the secondary power supply voltage may provide power to Input/Output (I/O) intensive applications and the action may be to throttle I/O applications by limiting maximum memory channels or storage channels or by reducing operating frequencies.

In one embodiment, determining that a voltage drop event has occurred and determining whether the voltage drop event is an external event or an internal event may be implemented in a decision matrix, and the decision matrix may be configured to generate a decision interrupt to cause a processor to take the action based on the diagnostic information.

In one embodiment, determining that a voltage drop event has occurred and determining whether the voltage drop event is an external event or an internal event may be implemented in firmware to be executed by a processor.

In another exemplary embodiment, there is provided a semiconductor chip that may comprise: a plurality of voltage comparators each configured to compare a power supply voltage to a respective reference voltage, a sampler and counter circuit configured to collect voltage information and timing information from the plurality of voltage comparators, a decision matrix configured to determine whether a voltage drop event has occurred based on voltage information and duration information associated with a voltage drop event reported from the sampler and counter circuit and generate diagnostic information that includes whether the voltage drop event is an external event or an internal event determined based on the voltage information and the timing information reported from the sampler and counter circuit, and a processor configured to take an action based on the diagnosis information from the decision matrix.

In one embodiment, the voltage information and the timing information may indicate that a primary power supply voltage reports a voltage dropping before any secondary power supply voltage reports a voltage dropping, and the voltage drop event may be determined to be an external event.

In one embodiment, the action may be a power loss protection procedure to save critical data from memory to non-volatile storage.

In one embodiment, the voltage information and the timing information may indicate that a secondary power supply voltage reports a voltage dropping before a primary power supply voltage reports a voltage dropping, and the voltage drop event may be determined to be an internal event.

In one embodiment, the voltage information and the timing information may indicate that only one secondary power supply voltage reports a voltage dropping, and the voltage drop event may be determined to be an internal event.

In one embodiment, the secondary power supply voltage may provide power to core intensive applications and the action may be to scale back an operating frequency of a primary clock of the semiconductor chip.

In one embodiment, the secondary power supply voltage may provide power to Input/Output (I/O) intensive applications and the action may be to throttle I/O applications by limiting maximum memory channels or storage channels or by reducing operating frequencies.

In one embodiment, the decision matrix may be configured to generate a decision interrupt to cause the processor to take the action based on the diagnostic information.

In yet another exemplary embodiment, there is provided a semiconductor chip that may comprise: a plurality of voltage comparators each configured to compare a power supply voltage to a respective reference voltage, a sampler and counter circuit configured to collect voltage information and timing information from the plurality of voltage comparators, and a processor. The processor may be configured to: determine whether a voltage drop event has occurred based on voltage information and duration information associated with a voltage drop event reported from the sampler and counter circuit, generate diagnostic information that includes whether the voltage drop event is an external event or an internal event determined based on the voltage information and the timing information reported from the sampler and counter circuit, and take an action based on the diagnosis information.

In one embodiment, the voltage information and the timing information may indicate that a primary power supply voltage reports a voltage dropping before any secondary power supply voltage reports a voltage dropping, the voltage drop event may be determined to be an external event, and the action may be a power loss protection procedure to save critical data from memory to non-volatile storage.

In one embodiment, the voltage information and the timing information may indicate that a secondary power supply voltage reports a voltage dropping before a primary power supply voltage reports a voltage dropping, and the voltage drop event may be determined to be an internal event.

In one embodiment, the voltage information and the timing information may indicate that only one secondary power supply voltage reports a voltage dropping, and the voltage drop event may be determined to be an internal event.

Some or all of the disclosed methods and operations may be implemented as computer executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC) or a computer processor. Any of the computer-executable instructions for implementing the disclosed techniques as well as any data created and used during implementation of the disclosed embodiments can be stored on one or more computer readable media (e.g., non-transitory computer-readable media).

Various operations may be described as multiple discrete operations in turn, in a manner that may be helpful in understanding embodiments of the present invention; however, the order of description should not be construed to imply that these operations are order dependent. Moreover, some embodiments may include more or fewer operations than may be described.

The description may use the phrases "in an embodiment," "in embodiments," "in some embodiments," or "in various embodiments," which may each refer to one or more of the same or different embodiments. Furthermore, the terms "comprising," "including," "having," and the like, as used with respect to embodiments of the present invention, are synonymous.

The terms chip, die, integrated circuit, monolithic device, semiconductor device, and microelectronic device are often used interchangeably in the microelectronics field. The present invention is applicable to all of the above as they are generally understood in the field.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for managing voltage drops in a semiconductor chip, comprising:
    monitoring power supply voltages for different voltage domains in the semiconductor chip by a voltage drop detection circuit;
    determining that a voltage drop event has occurred based on voltage information and duration information associated with the voltage drop event reported from the voltage drop detection circuit;
    generating diagnostic information that includes whether the voltage drop event is an external event or an internal event determined based on the voltage information and timing information reported from the voltage drop detection circuit; and
    taking an action based on the diagnosis information.

2. The method of claim 1, wherein the voltage information and the timing information reported from the voltage drop detection circuit indicate that a primary power supply voltage reports a voltage dropping before any secondary power supply voltage reports a voltage dropping, and the voltage drop event is determined to be an external event.

3. The method of claim 2, wherein the action is a power loss protection procedure to save critical data from memory to non-volatile storage.

4. The method of claim 1, wherein the voltage information and the timing information reported from the voltage drop detection circuit indicate that a secondary power supply voltage reports a voltage dropping before a primary power supply voltage reports a voltage dropping, and the voltage drop event is determined to be an internal event.

5. The method of claim 1, wherein the voltage information and the timing information reported from the voltage drop detection circuit indicate that only one secondary power supply voltage reports a voltage dropping, and the voltage drop event is determined to be an internal event.

6. The method of claim 5, wherein the secondary power supply voltage provides power to core intensive applications and the action is to scale back an operating frequency of a primary clock of the semiconductor chip.

7. The method of claim 5, wherein the secondary power supply voltage provides power to Input/Output (I/O) intensive applications and the action is to throttle the I/O intensive applications by limiting maximum memory channels or storage channels or by reducing operating frequencies.

8. The method of claim 1, wherein determining that a voltage drop event has occurred and determining whether the voltage drop event is an external event or an internal event are implemented in a decision matrix, and the decision matrix is configured to generate a decision interrupt to cause a processor to take the action based on the diagnostic information.

9. The method of claim 1, wherein determining that a voltage drop event has occurred and determining whether the voltage drop event is an external event or an internal event are implemented in firmware to be executed by a processor.

10. A semiconductor chip, comprising:
a plurality of voltage comparators each configured to compare a power supply voltage to a respective reference voltage;
a sampler and counter circuit configured to collect voltage information and timing information from the plurality of voltage comparators;
a decision matrix configured to determine whether a voltage drop event has occurred based on the voltage information and duration information associated with a voltage drop event reported from the sampler and counter circuit, and generate diagnostic information that includes whether the voltage drop event is an external event or an internal event determined based on the voltage information and the timing information reported from the sampler and counter circuit; and
a processor configured to take an action based on the diagnosis information from the decision matrix.

11. The semiconductor chip of claim 10, wherein the voltage information and the timing information indicate that a primary power supply voltage reports a voltage dropping before any secondary power supply voltage reports a voltage dropping, and the voltage drop event is determined to be an external event.

12. The semiconductor chip of claim 11, wherein the action is a power loss protection procedure to save critical data from memory to non-volatile storage.

13. The semiconductor chip of claim 10, wherein the voltage information and the timing information indicate that a secondary power supply voltage reports a voltage dropping before a primary power supply voltage reports a voltage dropping, and the voltage drop event is determined to be an internal event.

14. The semiconductor chip of claim 10, wherein the voltage information and the timing information indicate that only one secondary power supply voltage reports a voltage dropping, and the voltage drop event is determined to be an internal event.

15. The semiconductor chip of claim 14, wherein the secondary power supply voltage provides power to core intensive applications and the action is to scale back an operating frequency of a primary clock of the semiconductor chip.

16. The semiconductor chip of claim 14, wherein the secondary power supply voltage provides power to Input/Output (I/O) intensive applications and the action is to throttle the I/O intensive applications by limiting maximum memory channels or storage channels or by reducing operating frequencies.

17. The semiconductor chip of claim 10, wherein the decision matrix is configured to generate a decision interrupt to cause the processor to take the action based on the diagnostic information.

18. A semiconductor chip, comprising:
a plurality of voltage comparators each configured to compare a power supply voltage to a respective reference voltage;
a sampler and counter circuit configured to collect voltage information and timing information from the plurality of voltage comparators; and
a processor configured to:
determine whether a voltage drop event has occurred based on the voltage information and duration information associated with a voltage drop event reported from the sampler and counter circuit,
generate diagnostic information that includes whether the voltage drop event is an external event or an internal event determined based on the voltage information and the timing information reported from the sampler and counter circuit; and
take an action based on the diagnosis information.

19. The semiconductor chip of claim 18, wherein the voltage information and the timing information indicate that a primary power supply voltage reports a voltage dropping before any secondary power supply voltage reports a voltage dropping, the voltage drop event is determined to be an external event, and the action is a power loss protection procedure to save critical data from memory to non-volatile storage.

20. The semiconductor chip of claim 18, wherein the voltage information and the timing information indicate that a secondary power supply voltage reports a voltage dropping before a primary power supply voltage reports a voltage dropping, and the voltage drop event is determined to be an internal event.

21. The semiconductor chip of claim 18, wherein the voltage information and the timing information indicate that only one secondary power supply voltage reports a voltage dropping, and the voltage drop event is determined to be an internal event.

* * * * *